United States Patent

Smith

(10) Patent No.: US 6,688,401 B2
(45) Date of Patent: Feb. 10, 2004

(54) HORSESHOE

(76) Inventor: Jeff Smith, 6641 Merchandise Way, Diamond Springs, CA (US) 95619

( * ) Notice: Subject to any disclaimer, the term of this patent is extended or adjusted under 35 U.S.C. 154(b) by 0 days.

(21) Appl. No.: 10/180,474

(22) Filed: Jun. 25, 2002

(65) Prior Publication Data

US 2003/0234112 A1 Dec. 25, 2003

(51) Int. Cl.[7] .............................. A01L 3/02; A01L 5/00
(52) U.S. Cl. ............................. 168/13; 168/28; 168/17
(58) Field of Search ................................ 168/12–14, 26, 168/28, 24, 4, 11, 23, 17; 606/212; 59/61, 36, 56

(56) References Cited

U.S. PATENT DOCUMENTS

| | | | | |
|---|---|---|---|---|
| 246,928 A | * | 9/1881 | Watts | 168/11 |
| 522,789 A | * | 7/1894 | Gibbs | 168/13 |
| 2,024,265 A | * | 12/1935 | Anderson et al. | 168/4 |
| 3,494,422 A | * | 2/1970 | Clark | 168/4 |
| 3,921,721 A | * | 11/1975 | George | 168/4 |
| 4,182,340 A | * | 1/1980 | Spencer | 606/212 |
| 4,573,538 A | * | 3/1986 | Figueras | 168/14 |
| 4,844,172 A | * | 7/1989 | Lee | 168/13 |
| 5,002,132 A | * | 3/1991 | Fox et al. | 168/4 |
| 5,069,289 A | * | 12/1991 | Schaffer | 168/4 |
| 5,353,878 A | * | 10/1994 | Lee | 168/13 |
| 5,699,861 A | * | 12/1997 | Sigafoos | 168/17 |
| 6,131,665 A | * | 10/2000 | Rovelli et al. | 168/28 |

FOREIGN PATENT DOCUMENTS

JP      401196246 A  *  8/1989  ............. A01L/3/00

* cited by examiner

*Primary Examiner*—Son T Nguyen
(74) *Attorney, Agent, or Firm*—Chernoff, Vilhauer, McClung & Stenzel, LLP

(57) ABSTRACT

A horseshoe made from rubber or an elastomeric material has a tread portion with a plurality of interconnected side-by-side hollow cylindrical buttons. The buttons are open at their upper ends and their lower ends are covered by a thin film of the rubber or elastomeric material. The horseshoe is attached to the horse's hoof with an adhesive and sufficient adhesive is applied to the tread portion to fill the buttons with adhesive material and provide a thin layer of the adhesive material between the tread portion and the hoof when the horseshoe is pushed toward the hoof.

8 Claims, 3 Drawing Sheets

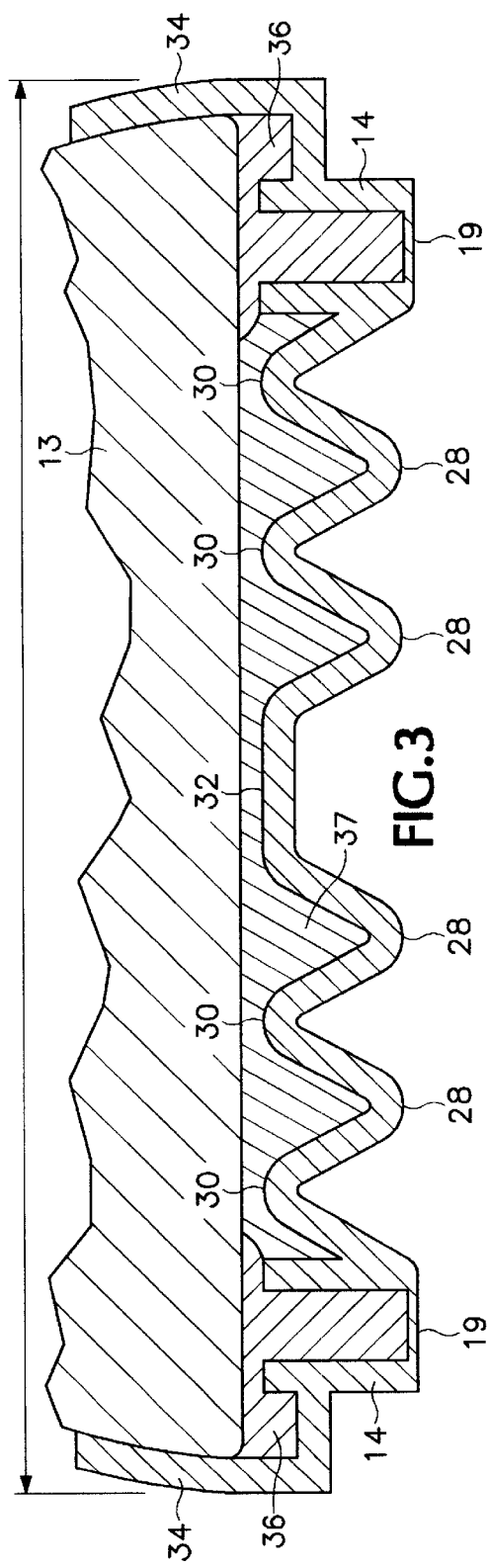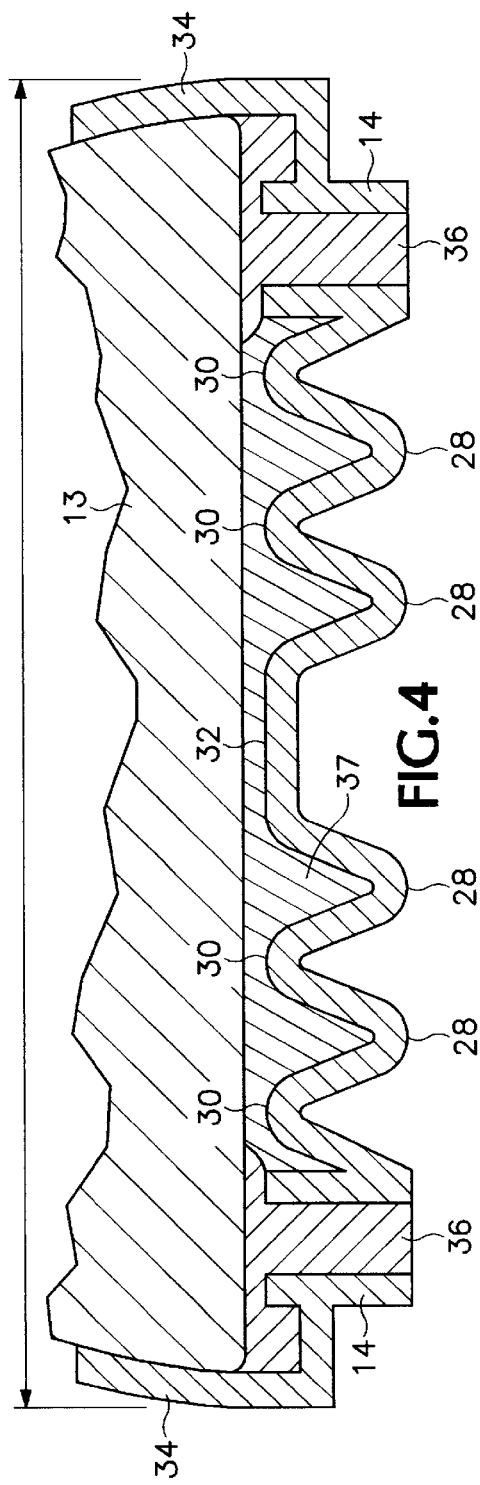

HORSESHOE

BACKGROUND AND SUMMARY OF THE INVENTION

This invention relates to a horseshoe made from an elastically deformable material, and in particular to such a horseshoe which has a plurality of hard wear pads located in its lower surface.

While the traditional U-shaped metal or hard plastic horseshoe protects horses hooves, it has several disadvantages. First, it has no resiliency, and, as a result, its use on hard surfaces can be stressful on the horse's legs. In addition, a metal or plastic shoe gets poor traction on hard surfaces, such as concrete or asphalt. Horses who spend a significant amount of time on these surfaces and must change directions rapidly can easily slip and injure themselves. This is a particular problem with mounted police horses. In addition, metal or plastic horseshoes can cause considerable damage to surfaces such as asphalt. A metal or plastic horseshoe also leaves the center portion of the hoof exposed so that it can be injured if the horse steps on a protruding object. In particular the frog located at the back of the hoof is left exposed. Not only do traditional metal or plastic horseshoes leave the frog exposed, they raise the frog above the ground surface so that the frog cannot serve its intended purpose.

Horseshoes made of rubber or an elastomeric material have been used to overcome the foregoing shortcomings of traditional metal or plastic horseshoes. However, if a horseshoe is simply made from rubber or a similar material, it will wear so quickly that it would be impractical. To prevent this rapid wear the prior art horseshoes of this type incorporate canvas or similar material or metal into the material they are made of. While this increases the life of the horseshoe it makes construction difficult and the resulting horseshoe expensive. Moreover, most of the prior art composite horseshoes wear unevenly or wear varies from horseshoe to horseshoe. Thus, rubber or elastomeric horseshoes have not been widely accepted.

The subject invention overcomes the foregoing shortcomings and limitations of prior art horseshoes by providing a horseshoe made from an elastically deformable material which has a tread portion with a plurality of hollow cylindrical buttons which are open at their upper ends and are covered at their lower ends with a thin film of material. The horseshoe is attached to the horse's hoof with an adhesive and sufficient adhesive is used to fill the buttons and provide a thin layer of adhesive material between the hoof and the horseshoe. When the horse walks on the shoe, the thin film at the bottom of the buttons wears off exposing the adhesive. The adhesive buttons prevent the shoe from wearing rapidly without materially affecting the dampening and skid resistant characteristics of the elastic material.

The foregoing and other objectives, features, and advantages of the invention will be more readily understood upon consideration of the following detailed description of the invention, taken in conjunction with the accompanying drawings.

BRIEF DESCRIPTION OF THE SEVERAL VIEWS OF THE DRAWINGS

FIG. 3 is a cross-sectional view taken on the line 3—3 of FIG. 2.

FIG. 4 is a cross-sectional view similar to FIG. 3 in which the horseshoe has been laterally compressed to fit a narrower hoof.

DETAILED DESCRIPTION OF THE PREFERRED EMBODIMENT

Figure 1:
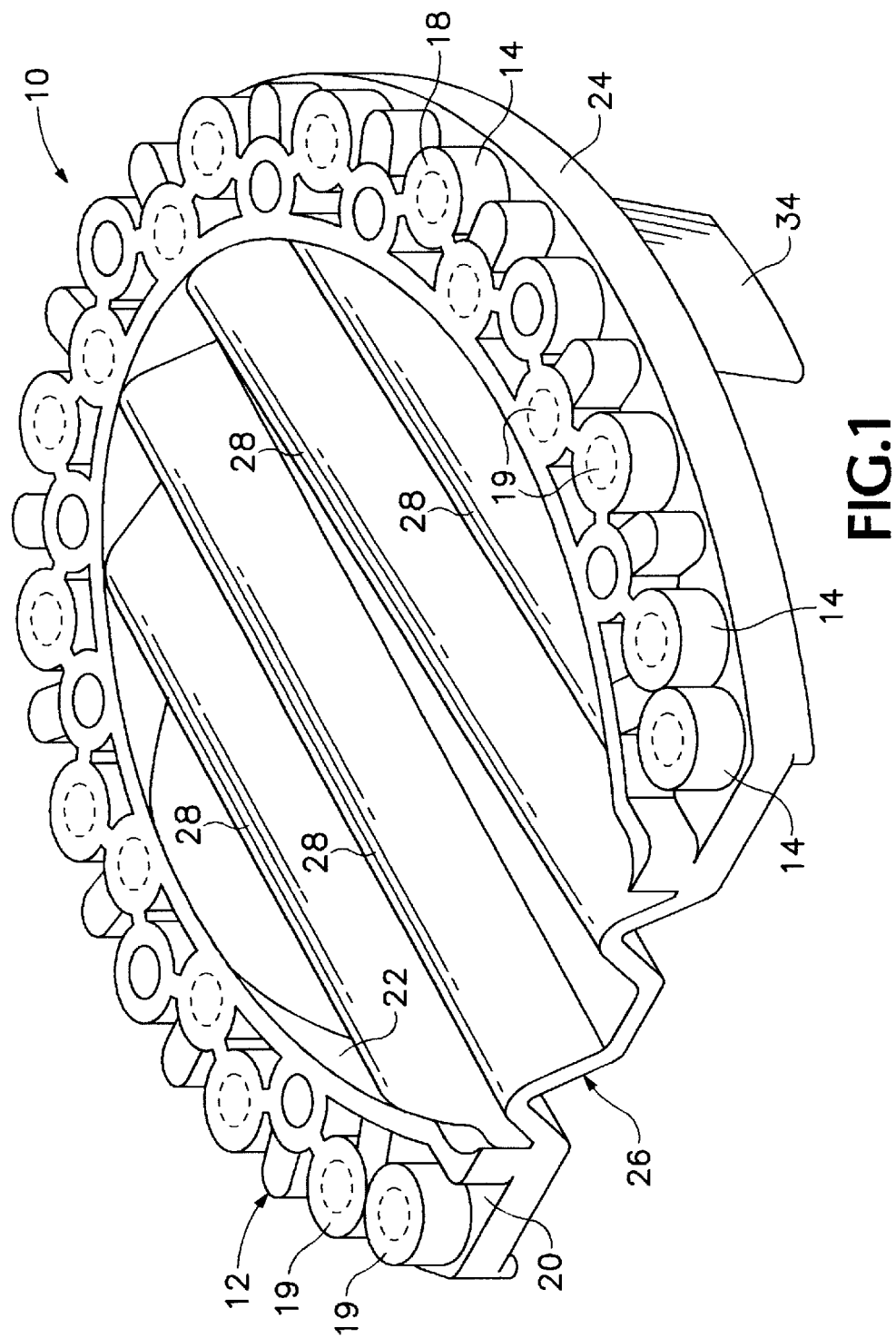
FIG. 1 is a perspective view, looking from below, of a horseshoe embodying the subject invention.
Figure 2:
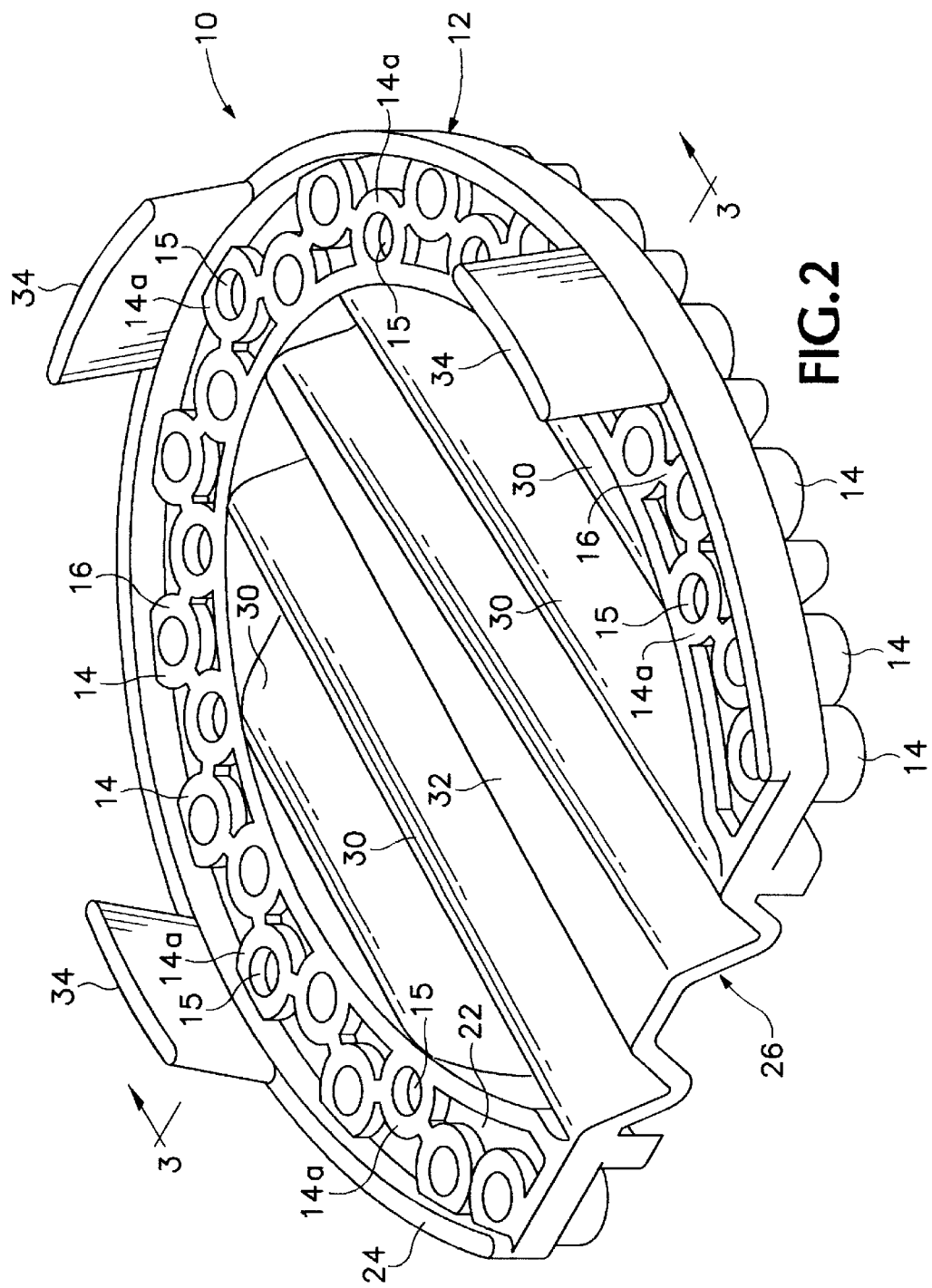
FIG. 2 is a perspective view of the horseshoe of FIG. 1, looking from above.

Referring now to FIGS. 1 and 2 of the drawings, a horseshoe 10 is made from rubber or a similar elastomeric material. The horseshoe has a tread portion 12 which extends around the outer periphery of the horseshoe covering the portion of the hoof 13 that would be covered by a normal metal horseshoe. The tread portion supports the majority of the horse's weight and provides most of the contact area with the ground. In the embodiment illustrated, the tread pattern is approximately ¾ inches wide and slightly more than ½ inch thick but its size depends on the particular application the horseshoe is intended for. The tread portion includes a plurality of interconnected side-by-side hollow cylindrical buttons 14 having upper surfaces 16 which support the hoof and lower surfaces 18 which contact the ground. The majority of the buttons are open at their upper ends and are covered at their lower ends with a thin film 19 of the material the horseshoe is constructed of. A few of the buttons 14a are open at both the top and bottom ends but thin plugs 15 block them medially. In the embodiment illustrated the buttons have an outer diameter of approximately ½ inch and an inner diameter of approximately ¼ inch, but again the size and wall thickness of the button can vary depending on the intended application of the horseshoe. A thin horizontal web 20 interconnects the buttons at approximately their mid-points. A thin vertical band 22 interconnects the buttons at the inner periphery of the tread portion, extending between the upper and lower surfaces of the buttons. A thin vertical lip 24 interconnects the buttons at the outer periphery of the tread portion. The lip 24 extends from the web upwardly to slightly beyond the upper surface of the buttons. The lip 24 helps align the horseshoe on the horse's hoof and serves as a dam for the adhesive used to attach the horseshoe.

A thin central plate 26 covers the portion of the hoof not covered by the tread portion. The plate 26 and the tread portion are formed integrally from the same material, preferably by injection, compression or transfer molding. The plate 26 has an accordian shape in cross section extending across the horseshoe from side to side. The peaks 28 of plate are coplanar with the lower surface 18 of the buttons and the valleys 30 are coplanar with the upper surface 16 of the buttons. The valley at the center of the plate has a flat surface 32 which is wider at the back of the horseshoe than at the front. This flat surface 32 contacts the frog on the horse's hoof. This both protects the frog and allows it to serve its intended purpose. Extending upwardly from the lip 24 on each side and at the front of the horseshoe are alignment tabs 34. The alignment tabs help align the horseshoe on the hoof.

The horseshoe is installed by placing sufficient adhesive 36 on the upper surface of the tread portion to completely fill all of the buttons 14 and to provide a layer of adhesive between the upper surface and the hoof. The horseshoe is then pushed up against the hoof to force the adhesive into the buttons and fill them completely, and the horseshoe is held in place until the adhesive sets up. A quick-drying adhesive is used to facilitate this process. The accordian-shaped center plate 26 permits the rear of the horseshoe to be deflected inwardly or outwardly while it is being applied to accommodate a narrower or wider hoof, FIG. 4. A softer cushioning material 37, which may also be an adhesive, is injected between the hoof 13 and the plate 26 to fill all the remaining open area between the horseshoe and the hoof. The cushioning material holds the plate 26 in place and cushions the center portion of the hoof.

Once the adhesive has cured sufficiently, the horse is walked, which will wear off the film 19 at the lower ends of the buttons, exposing the adhesive.

The use of rubber horseshoes lessens the shock-loading on a horse's legs when it is on a hard surface. It also prevents slipping on hard surfaces, as will occur with metal or plastic shoes. Finally, it prevents the horse from damaging the hard surfaces. However, unlike prior art rubber horseshoes, the adhesive in the buttons prevents the shoe from wearing too rapidly when it is used on the hard surface it is intended for. In addition, the use of buttons in the tread pattern provides more stiffness than a plain rubber shoe would have and it provides good traction in any direction.

Finally, the rubber center portion 26 protects the entire hoof from being damaged by protruding objects the horse might step on. Because the flat surface 32 of the center portion is in contact with the hoof, the frog works in its intended manner when the horse walks or runs.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A horseshoe made from an elastically deformable material comprising:
   (a) A tread portion;
   (b) said tread portion having an upper surface which contacts a horse's hoof and a lower surface which contacts the ground, said tread portion including a plurality of hollow cylindrical buttons;
   (c) said buttons being open at said upper surface and being closed at said lower surface by a thin film of said elastically deformable material; wherein
   (d) said buttons are filled with an adhesive material which is used to attach said horseshoe to the horse's hoof.

2. The horseshoe of claim 1 wherein said tread portion defines the outer periphery of said horseshoe.

3. The horseshoe of claim 1 including a center portion which covers the portion of the hoof not covered by said tread portion.

4. The horseshoe of claim 3 wherein said center portion comprises a thin sheet of elastically deformable material having an accordian pattern in cross section extending laterally across said horseshoe.

5. A method of attaching a horseshoe made from an elastically deformable material to a hoof, comprising:
   (a) Providing a horseshoe having a tread portion with a plurality of hollow cylindrical buttons which are closed at the lower ends by a thin film of said elastically deformable material and are open at the top ends, and a center plate which covers the portion of the hoof not covered by the tread portion;
   (b) applying sufficient adhesive to the upper surface of said tread portion to fill said buttons and provide a layer of adhesive between said horseshoe and said hoof; and
   (c) urging said horseshoe against said hoof to force said adhesive into said buttons.

6. The method of claim 5 including the step of injecting a cushioning material between said hoof and said center plate after the horseshoe has been urged against said hoof.

7. The method of claim 6 wherein said cushioning material includes an adhesive.

8. The method of claim 5 including the additional step of walking the horse after the horseshoe has been attached to remove said film at the lower ends of said buttons and expose the adhesive located within said buttons.

* * * * *